(12) United States Patent
Xiong et al.

(10) Patent No.: US 9,751,076 B1
(45) Date of Patent: Sep. 5, 2017

(54) SYNTHESIS OF NANO CRYSTALLINE NIOBIA/CARBON COMPOSITES WITH IMPROVED HYDROTHERMAL STABILITY

(71) Applicants: Haifeng Xiong, Albuquerque, NM (US); Abhaya Datye, Albuquerque, NM (US)

(72) Inventors: Haifeng Xiong, Albuquerque, NM (US); Abhaya Datye, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 536 days.

(21) Appl. No.: 14/094,002

(22) Filed: Dec. 2, 2013

Related U.S. Application Data

(60) Provisional application No. 61/732,194, filed on Nov. 30, 2012.

(51) Int. Cl.
  *B01J 23/20* (2006.01)
(52) U.S. Cl.
  CPC .................................... *B01J 23/20* (2013.01)
(58) Field of Classification Search
  None
  See application file for complete search history.

(56) References Cited

U.S. PATENT DOCUMENTS

| | | | |
|---|---|---|---|
| 2004/0047798 A1* | 3/2004 | Oh | C01B 31/00 423/414 |
| 2011/0082024 A1* | 4/2011 | Liu | A61K 9/51 502/5 |

OTHER PUBLICATIONS

Takahashi et al.; Nanosized Ni/SiO2 Catalyst Prepared by Homogeneous Precipitation in Wet Silica Gel; J. Nanosci Nanotechnology; 1(2), 169-176; 2001.*
Sevilla et al, Chem. Eur. J. 2009, 15, 4195-4203.
Hu et al Adv. Mater. 2010, 22, 813-828.
Braghirolli et al Bioresource Tech. 151 (2014) 271-277.

* cited by examiner

*Primary Examiner* — Guinever S Gregorio
(74) *Attorney, Agent, or Firm* — Gonzales Patent Services; Ellen M Gonzales

(57) ABSTRACT

Novel transition element-embedded carbon materials and methods for forming the same. The embedded transition elements can be oxides or hydroxides and may include a transition metal. In some cases the transition element-embedded materials are catalytic material suitable for use in a variety of catalytic systems. According to one specific example, the transition element that is embedded is a niobia species.

15 Claims, 13 Drawing Sheets

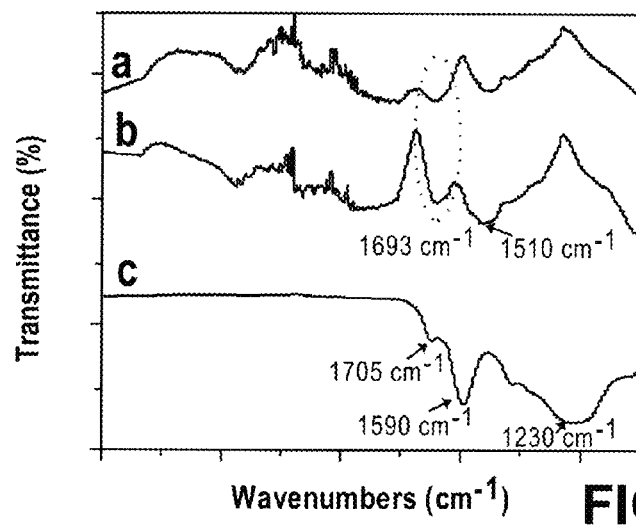
FIG. 36
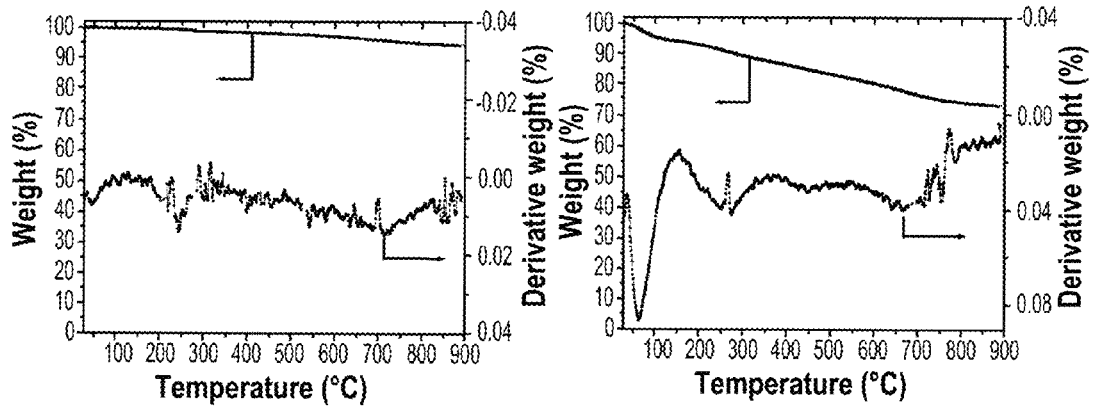
FIG. 37
FIG. 38
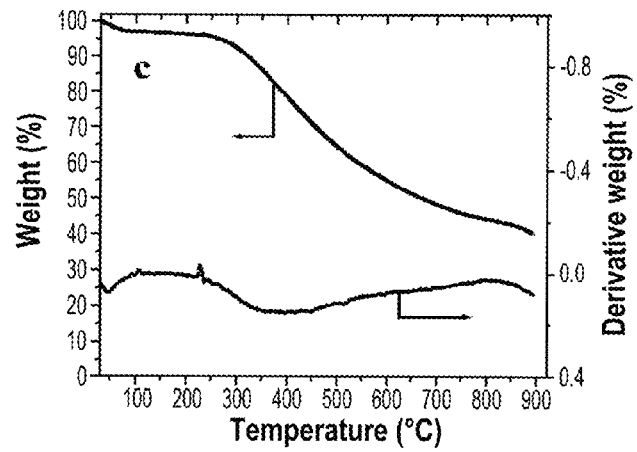
FIG. 39

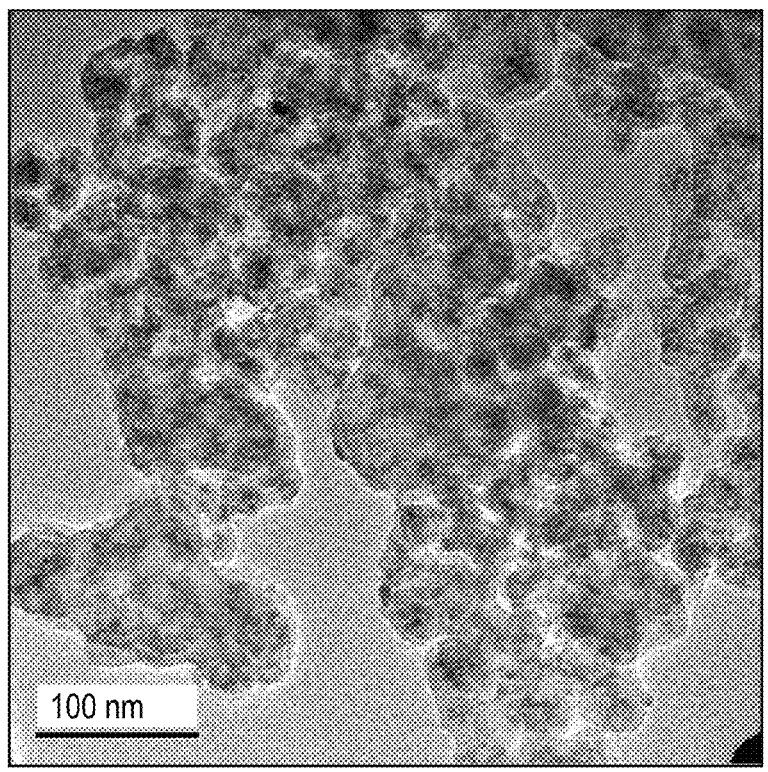
FIG. 44
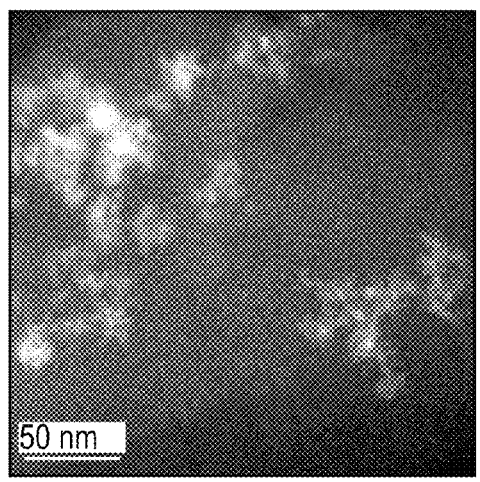 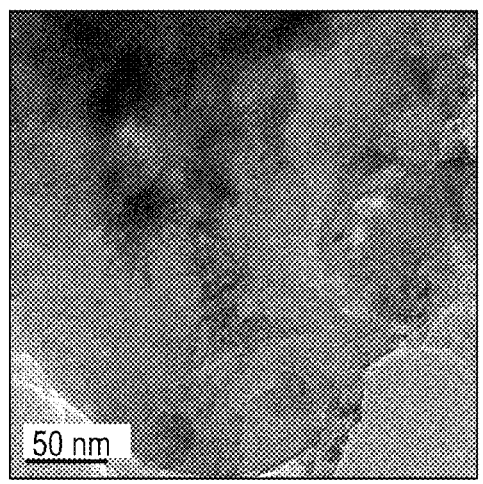
FIG. 45  FIG. 46

SYNTHESIS OF NANO CRYSTALLINE NIOBIA/CARBON COMPOSITES WITH IMPROVED HYDROTHERMAL STABILITY

CROSS-REFERENCE TO RELATED APPLICATIONS

The following application claims benefit of U.S. Provisional Application No. 61/732,194, filed Nov. 30, 2012, which is hereby incorporated by reference in its entirety.

STATEMENT REGARDING GOVERNMENT SPONSORED RESEARCH

This invention was made with Government support under Grant No. EEC 0813570 awarded by NSF Engineering Research Center for Biorenewable Chemicals (CBiRC). The U.S. Government has certain rights in this invention.

BACKGROUND

At present, there is a great interest in catalytically converting biomass-derived molecules to hydrocarbons and chemicals [1-3]. Biomass-derived reactants are typically highly functionalized, water-soluble molecules; therefore they are more suitably processed in the aqueous phase. However, conventional catalysts and supports suitable for gas phase reactions may not be suitable for aqueous phase reactions at temperatures in excess of 200° C. because the oxide supports can react with water and lose surface area. For example, the surface area of SBA-15 silica decreased from 930 to 31 m$^2$/g after a hydrothermal treatment (liquid water at 200° C. for 12 h) [4]. In an aqueous phase reactor, γ-alumina was converted into a hydrated boehmite phase with significantly decreased acidity and surface area, which caused the sintering of the supported Pt metal particles [5] and the encapsulation of catalytic Pt sites by the hydroxylated alumina layers [6]. Further, it has been reported that the zeolite structure changed when exposed to aqueous phase conditions [7]. Consequently, a central challenge for production of biorenewable fuels and chemicals is the development of catalytic materials that are hydrothermally stable during aqueous-phase reactions.

Solid acid catalysts have served as important functional materials for the petroleum refinery industry and the production of chemicals [8, 9]. Niobium oxide is an important solid acid catalyst that can be used extensively in important biomass reactions, such as dehydration, aldol condensation, hydrolysis and ketonization [10, 11]. Mesoporous niobium oxides with high surface areas recently have been synthesized by template-assisted self-assembly and antisolvent precipitation routes [12-15]. However, pure niobia was found to crystallize and deactivate quickly in liquid water when the temperature was higher than 200° C. [16]. To address this problem of hydrothermal stability, one approach that has been demonstrated to be effective is to disperse a thin film of niobia on a mesoporous support by atomic layer deposition (ALD). However, ALD requires sequential reactions with two separate reactants and multiple cycles to achieve niobia coatings.[4] Therefore, a simple one pot synthesis to achieve hydrothermally stable niobia would be desirable.

SUMMARY

The disclosure provides novel transition element-embedded carbon materials and methods for forming the same. According to some embodiments the embedded transition elements are oxides or hydroxides and may include a transition metal. In some cases the transition element-embedded materials are catalytic materials suitable for use in a variety of catalytic systems. According to one specific example, the transition element that is embedded is a niobium species.

BRIEF DESCRIPTION OF THE DRAWINGS

FIG. 36 is FTIR spectra of the niobia/carbon catalysts: line (a) Nb/CB-1-DP; line (b) Nb/CB-2-DP; line (c) Nb/CS-DP.

FIG. 37 is TGA and DTG data for Nb/CB-1-DP niobia/carbon catalysts in N2.

FIG. 38 is TGA and DTG data for Nb/CB-2-DP niobia/carbon catalysts in N2.

FIG. 39 is TGA and DTG data for Nb/CS-HT niobia/carbon catalysts in N2.

FIG. 44 shows a TEM image of 10Nb/CS-HT niobia/carbon catalysts prepared by DPC.

FIG. 45 shows STEM/TEM images of niobia/carbon catalysts with high niobium concentration of 16.6 mmol Nb/L (50 mL of water).

FIG. 46 shows STEM/TEM images of 5Nb/CS-HT catalysts with high niobium concentration of 16.6 mmol Nb/L (50 mL of water).

DETAILED DESCRIPTION

The present disclosure provides novel transition element embedded materials and methods for forming the same. According to some embodiments the embedded transition elements are oxides or hydroxides and may include a transition metal. In some cases the transition element-embedded materials are catalytic materials suitable for use in a variety of catalytic systems. According to one specific example, the transition element that is embedded is a niobium species.

According a first embodiment, the present disclosure provides a deposition precipitation-carbonization (DPC) method for preparing highly dispersed transition metal/carbon catalysts with improved hydrothermal stability for aqueous phase reactions. This method of preparation is simpler than the conventional impregnation route which would require acid treatment of the carbon to generate functional groups that are necessary for the stabilization of the deposited oxide.

While the present disclosure and examples are described primarily with regard to niobium, it should be understood that the presently described methods are equally applicable to other transition elements including, but not necessarily limited to, Ag, Au, Ce, Co, Cr, Cu, Fe, Ir, Mn, Mo, Ni, Pt, Ru, Ta, Ti, V, W, and Zr, and that such transition elements, could simply be substituted in place of, or in addition to, niobium in the above-identified methods.

Figure 1:
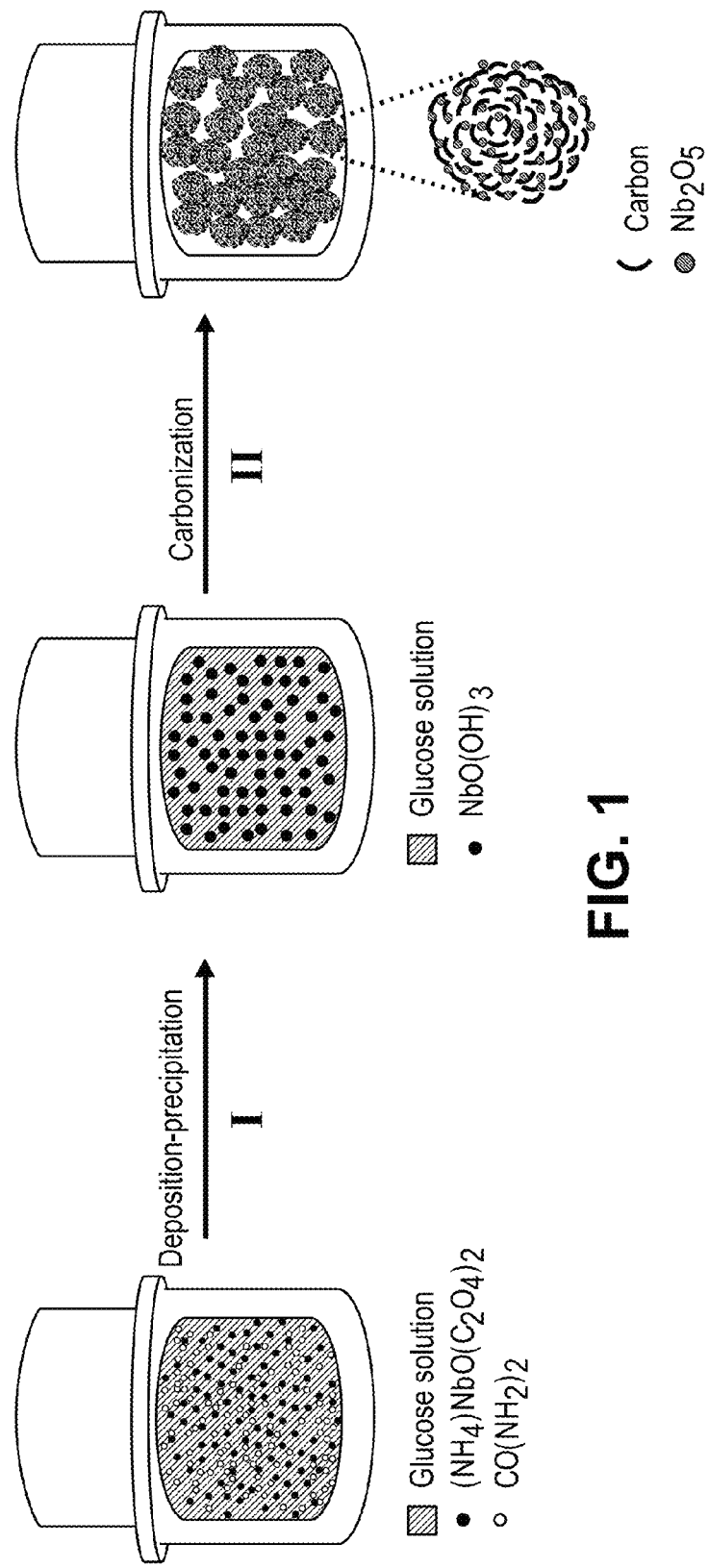
FIG. 1 depicts various chemical processes that take place during an exemplary embodiment of a method according to the present disclosure.

FIG. 1 is a schematic illustration of an exemplary method for producing a niobium embedded carbon material according to an embodiment of the present disclosure. Initially, a niobium-containing compound, a carbon containing sugar solution such as glucose, and a base such as urea are combined under high temperature conditions (typically equal to or greater than 160° C.). The high temperatures are maintained for an extended period of time (i.e. at least 2 hours) so as to allow carbonization of the sugars and thus the formation of aromatic compounds and oligosaccharides, to occur gradually and at the same time as the deposition-precipitation of the niobia. While deposition-precipitation and carbonization are shown as two separate steps in the figures in order to demonstrate that these two processes occur inside the same reaction vessel, in reality the reaction conditions enable the two processes to take place simultaneously, allowing the newly formed niobium hydroxide and/or oxide species to mix freely with the newly formed aromatics and oligosaccharides. The mixture is filtered, dried, and then pyrolyzed, resulting in the formation of a particulate niobia/carbon material having embedded niobium species which are highly and evenly dispersed throughout the carbon particles. Those of skill in the art will understand that depending on the particular transition element being used, that either or both hydroxide and oxide elements may be formed during the deposition/precipitation step and that in some cases only the hydroxide is formed during the precipitation step. However, because the oxide can then be formed during the subsequent pyrolyzation step, unless specifically called out, the terms hydroxide and oxide are used interchangeably in the present disclosure.

Examples of suitable niobium precursors include, but are not limited to, ammonium niobium oxalate. As explained in greater detail below and in the Examples section, the initial concentration of niobium (or other transitional element) can affect the ultimate morphology of the resulting material. However, in general, we have found an initial niobium (or other transition element) concentration of between 1 wt % and 15 wt %, to produce desirable or satisfactory results although other concentrations outside of this range are contemplated by the present disclosure.

It will be appreciated that while the exemplary method shown and described with reference to FIG. 1 uses a glucose solution, any compound that forms oligosaccharides or other carbon precursors that will freely mix with the forming niobium hydroxide/oxide precursor species and produce carbon particles under pyrolysis conditions could be used. Examples of other suitable compounds include, but are not limited to, sugars such as sucrose. (Furthermore, we have found glucose concentrations of between 1% and 5% produce desirable or satisfactory results although other concentrations outside of this range are contemplated by the present disclosure.)

Furthermore, while the exemplary method shown and described with reference to FIG. 1 uses urea as the donor of hydroxyl ions, it will be appreciated that other bases may be used such as sodium hydroxide or sodium bicarbonate. Moreover, while we have found urea concentrations of between 0.1 wt % and 0.2 wt % to produce desirable or satisfactory results, other concentrations outside of this range are contemplated by the present disclosure.

Because it is important that the transitional element begin to form a hydroxide and/or oxide compound via deposition precipitation at the same time the sugar solution begins to carbonize, it is desirable that the reaction is carried out under conditions that allow these reactions to happen simultaneously. In general, we have found that when the reaction is performed at least 160° C.-240° C. for at least 2-12 hours, deposition precipitation and carbonization occur at the same time.

Heat treatment of the resulting mixture should be performed under suitable conditions to enable particulate carbon formation. We have found pyrolization at 350° C.-900° C. for 2-12 hours in a nitrogen flow to work. Other possible heat treatment options or conditions are possible but, according to some embodiments it may be undesirable to utilize an oxygen environment, as this may harm or burn up desirable carbon. In this case, other reducing environments for pyrolysis may be used such as dilute mixtures of hydrogen or ammonia in an inert atmosphere such as N2 or Argon.

As stated above, the particulate transition element/carbon materials formed by the presently described method comprise embedded transition element species that are highly and evenly dispersed throughout the carbon particles. For the purposes of the present disclosure, the term "embedded" is intended to mean that at least some of the niobia (or other transition element) species in the complex are completely encased by the carbon due to the carbon forming around the niobia species during the combined deposition-precipitation-carbonization steps. This is in contrast to carbon that has been "decorated" or even "infused" with niobium (or other species), wherein the niobium species is attached to the surface of the carbon. It is noted that even in those methods where niobium species are infused in a porous carbon structure, the niobium species are still attached only to the surface of the carbon structure, rather than encased by the carbon.

By highly and evenly dispersed, it is meant that the niobia (or other transition element) is distributed throughout the carbon-based particle so as to yield a small particle size, for example less than 10 nm. As described in greater detail below in the examples section, using the methods described herein it is possible to control the morphology of the resulting composite material. For example, concentrations of 6.28 mmol/L niobium resulted in the formation of only discrete niobia particles while concentrations of 16.6 mmol/L resulted in interconnected, rod-like $Nb_2O_5$ structures. In both cases, the niobium was more or less evenly distributed throughout the carbon particle.

The particulate niobia/carbon material formed from the above-described process has some unique features which enable it behave in unique and desirable ways. For example, while most pure carbon compounds are hydrophobic and therefore naturally localize in the organic phase, the presently described compounds naturally localize in the interface between the organic and aqueous phases in biphasic reactions.

According to various additional embodiments, the niobia-carbon compounds described herein can be subjected to additional post-processing steps. For example, because the compounds described herein contain niobia species dispersed throughout the particle, carbon layers can be removed, for example, by oxidation or hydrogenation, to expose additional niobia species.

Moreover, the embedded niobia-oxide species provide a simple mechanism for further functionalization of the niobia-carbon compounds. For example, acidic groups can be attached to the embedded niobia-oxide species to catalyze reactions. Alternatively other approaches to modify the hydroxide/oxide species or the carbon will provide additional functionality.

Furthermore, it will be appreciated in some embodiments that a mono-metallic catalyst may not be sufficiently stable or active. Therefore, according to some embodiments, the presently described method may incorporate the use of multiple metals or additional other transition elements including oxides and/or hydroxides in order to achieve a desired stability and/or activity.

According to various embodiments, the transition element-embedded materials described herein may include transition metal-embedded species that are available for use as a catalyst or as part of a catalyst. For the sake of clarity, in the present application the term "catalyst" is used to refer to a final product, suitable for use, for example, in a fuel cell, which has catalytic activity. The catalyst may include multiple types of materials, some of which may not in themselves have catalytic activity (for example, supporting material.) The term "catalytic material" is any material which has catalytic activity either on its own or as part of a catalyst. Accordingly, the transition metal-embedded materials described herein may act as a catalytic material that forms part of a catalyst, for example, by being deposited on a solid or other support, or the like.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

REFERENCES

[1] R. D. Cortright, R. R. Davda, J. A. Dumesic, *Nature* 2002, 418, 964.
[2] J. Q. Bond, D. M. Alonso, D. Wang, R. M. West, J. A. Dumesic, *Science* 2010, 327, 1110.
[3] D. A. Simonetti, J. Rass-Hansen, E. L. Kunkes, R. R. Soares, J. A. Dumesic, *Green Chem.* 2007, 9, 1073.
[4] Y. J. Pagán-Torres, J. M. R. Gallo, D. Wang, H. N. Pham, J. A. Libera, C. L. Marshall, J. W. Elam, A. K. Datye, J. A. Dumesic, *ACS Catal.* 2011, 1, 1234.
[5] R. M. Ravenelle, J. R. Copeland, W.-G. Kim, J. C. Crittenden, C. Sievers, *ACS Catal.* 2011, 1, 552.
[6] D. J. M. de Vlieger, B. L. Mojet, L. Lefferts, K. Seshan, *J. Catal.* 2012, 292, 239.
[7] R. M. Ravenelle, F. Schüβler, A. D'Amico, N. Danilina, J. A. van Bokhoven, J. A. Lercher, C. W. Jones, C. Sievers, *J. Phys. Chem. C* 2010, 114, 19582.
[8] T. Okuhara, *Chem. Rev.* 2002, 102, 3641.
[9] J. N. Armor, *Appl. Catal. A: Gen.* 2001, 222, 407.
[10] K. Tanabe, S. Okazaki, *Appl. Catal. A: Gen.* 1995, 133, 191.
[11] K. Tanabe, *Catal. Today* 2003, 78, 65.
[12] B. Lee, D. Lu, J. N. Kondo, K. Domen, *J. Am. Chem. Soc.* 2002, 124, 11256.
[13] P. Yang, D. Zhao, D. I. Margolese, B. F. Chmelka, G. D. Stucky, *Nature* 1998, 396, 152.
[14] D. M. Antonelli, J. Y. Ying, *Angew. Chem. Int. Ed.* 1996, 35, 426.
[15] C. C. Li, J. Dou, L. Chen, J. Lin, H. C. Zeng, *ChemCatChem* (2012), 10, 1675.
[16] H. N. Pham, Y. J. Pagan-Torres, J. C. Serrano-Ruiz, D. Wang, J. A. Dumesic, A. K. Datye, *Appl. Catal. A: Gen.* 2011, 397, 153.
[17] G. L. Bezemer, P. B. Radstake, V. Koot, A. J. van Dillen, J. W. Geus, K. P. de Jong, *J. Catal.* 2006, 237, 291.
[18] H. F. Xiong, M. A. M. Motchelaho, M. Moyo, L. L. Jewell, N. J. Coville, *J. Catal.* 2011, 278, 26.
[19] T. Sakaki, M. Shibata, T. Miki, H. Hirosue, N. Hayashi, *Bioresource Technol.* 1996, 58, 197.
[20] X. Sun, Y. Li, *Angew. Chem. Int. Ed.* 2004, 43, 597.
[21] G. Yu, B. Sun, Y. Pei, S. Xie, S. Yan, M. Qiao, K. Fan, X. Zhang, B. Zong, *J. Am. Chem. Soc.* 2009, 132, 935.
[22] T. Ressler, A. Walter, J. Scholz, J. P. Tessonnier, D. S. Su, *J. Catal.* 2010, 271, 305.
[23] K. Mette, A. Bergmann, J.-P. Tessonnier, M. Havecker, L. Yao, T. Ressler, R. Schlogl, P. Strasser, M. Behrens, *ChemCatChem* 2012, 4, 851.
[24] J.-P. Tessonnier, S. Goubert-Renaudin, S. Alia, Y. Yan, M. A. Barteau, *Langmuir* 2012, 29, 393.
[25] J. Q. Bond, D. Martin Alonso, R. M. West, J. A. Dumesic, *Langmuir* 2010, 26, 16291.
[26] H. Mehdi, V. Fábos, R. Tuba, A. Bodor, L. Mika, I. Horváth, *Top. Catal.* (2008), 48, 49.
[27] Davis, S. E.; Zope, B. N.; Davis, R. J. *Green Chemistry* 2012, 14, 143-147.
[28] Buntara, T.; Noel, S.; Phua, P. H.; Melián-Cabrera, I.; de Vries, J. G.; Heeres, H. *J. Angewandte Chemie International Edition* 2011, 50, 7083-7087.
[29] Chidambaram, M.; Bell, A. T. *Green Chemistry* 2010, 12, 1253-1262.
[30] Huber, G. W.; Chheda, J. N.; Barrett, C. J.; Dumesic, J. A. *Science* 2005, 308, 1446-1450.
[31] Roman-Leshkov, Y.; Barrett, C. J.; Liu, Z. Y.; Dumesic, J. A. *Nature* 2007, 447, 982-985.
[32] Qi, X.; Watanabe, M.; Aida, T. M.; Smith, R. L. *Bioresource Technology* 2012, 109, 224-228.
[33] Zhao, H.; Holladay, J. E.; Brown, H.; Zhang, Z. C. *Science* 2007, 316, 1597-600.
[34] Crossley, S.; Faria, J.; Shen, M.; Resasco, D. E. *Science* 2010, 327, 68-72.
[35] Wang, J.; Ren, J.; Liu, X.; Xi, J.; Xia, Q.; Zu, Y.; Lu, G.; Wang, Y. *Green Chem.* 2012, 14, 2506-2512.
[36] Wang, T.; Pagán-Tones, Y.; Combs, E.; Dumesic, J.; Shanks, B. *Topics in Catalysis* 2012, 55, 657-662.
[37] Huang, R.; Qi, W.; Su, R.; He, Z. *Chemical Communications* 2010, 46, 1115-1117.
[38] Nakajima, K.; Baba, Y.; Noma, R.; Kitano, M.; N. Kondo, J.; Hayashi, S.; Hara, M. *Journal of the American Chemical Society* 2011, 133, 4224-4227.
[39] Fan, C.; Guan, H.; Zhang, H.; Wang, J.; Wang, S.; Wang, X. *Biomass and Bioenergy* 2011, 35, 2659-2665.
[40] De, S.; Dutta, S.; Patra, A. K.; Bhaumik, A.; Saha, B. *Journal of Materials Chemistry* 2011, 21, 17505-17510.
[41] Nikolla, E.; Roman-Leshkov, Y.; Moliner, M.; Davis, M. E. *ACS Catalysis* 2011, 1, 408-410.
[42] Pham, H. N.; Anderson, A. E.; Johnson, R. L.; Schmidt-Rohr, K.; Datye, A. K. *Angewandte Chemie International Edition* 2012, 51, 13163-13167.
[43] Xiong, H. F.; Pham, H. N.; Datye, A. K. *Journal of Catalysis* 2013, submitted.
[44] Tanabe, K. *Catal. Today* 1990, 8, 1-11.
[45] Xiong, H.; Moyo, M.; Motchelaho, M. A. M.; Jewell, L. L.; Coville, N. J. *Applied Catalysis A: General* 2010, 388, 168-178.
[46] Pagán-Tones, Y. J.; Wang, T.; Gallo, J. M. R.; Shanks, B. H.; Dumesic, J. A. *ACS Catalysis* 2012, 2, 930-934.
[47] Román-Leshkov, Y.; Dumesic, J. *Topics in Catalysis* 2009, 52, 297-303.
[48] Moyo, M.; Motchelaho, M. A. M.; Xiong, H.; Jewell, L. L.; Coville, N. *J. Applied Catalysis A: General* 2012, 413-414, 223-229.
[49] Titirici, M. M.; Thomas, A.; Yu, S.-H.; Müller, J.-O.; Antonietti, M. *Chemistry of Materials* 2007, 19, 4205-4212.
[50] Shin, Y.; Wang, L.-Q.; Bae, I.-T.; Arey, B. W.; Exarhos, G. J. *The Journal of Physical Chemistry C* 2008, 112, 14236-14240.
[51] Baccile, N.; Laurent, G.; Babonneau, F.; Fayon, F.; Titirici, M.-M.; Antonietti, M. *The Journal of Physical Chemistry C* 2009, 113, 9644-9654.
[52] Pagán-Tones, Y. J.; Gallo, J. M. R.; Wang, D.; Pham, H. N.; Libera, J. A.; Marshall, C. L.; Elam, J. W.; Datye, A. K.; Dumesic, J. A. *ACS Catalysis* 2011, 1, 1234-1245.

Examples

Example I—Comparison of Nb Catalyst Formed from DPC with Commercial Nb Catalyst (HY-350)

Niobia/Carbon Catalyst Via Deposition Precipitation-Carbonization (DPC)

We prepared niobia/carbon catalysts containing 1-20 wt. % Nb loading. A typical preparation of catalyst (10 wt. % niobium loading) involved the use of 4 g of D-glucose dissolved in 200 mL deionized water and mixed with ammonium niobium oxalate (0.6724 g) and urea (0.2826 g). The mixture was placed in an autoclave and subjected to hydrothermal treatment at 200° C. for 12 h. After filtration, the sample was dried at 120° C. for 12 h and pyrolyzed at 400° C. for 6 h under a flow of N2. This method yields spherical particles of a niobia/carbon composite. The samples were denoted as xNb/CS-HT (x stands for niobium loading, CS stands for carbon sphere and HT stands for hydrothermal synthesis).

Pd/Niobia/Carbon Bifunctional Catalyst Preparation

The pyrolyzed Nb/CS-HT composites were used to prepare supported Pd catalysts consisting of Pd (1 wt. %) via incipient wetness impregnation of an aqueous solution of $Pd(NO_3)_2 \cdot xH_2O$ (Alfa Aesar). The catalysts were dried in air at 380 K overnight, followed by calcination at 523 K (1 K $min^{-1}$) in flowing air (100 $cm^3$ $min^{-1}$) for 2 h. For comparison, a reference Pd catalyst (1 wt. %) was prepared on amorphous $Nb_2O_5$ (CBMM, HY-340).

Catalyst Characterization

X-ray powder diffraction (XRD) patterns for the niobia catalysts were recorded with a Scintag Pad V diffractometer using Cu Kα radiation and a Ni filter. The scan range was 20-90° with 0.02° steps. Scanning transmission electron microscopy (STEM) was carried out in a JEOL 2010F microscope. The powders were deposited on holey carbon support films after being dispersed in ethanol. An electron probe diameter of 0.2 nm was scanned over the specimen, and electrons scattered at high angles were collected to form the images. The image contrast in the HAADF (high angle annular dark field) mode is atomic-number-dependent and is dependent also on the sample thickness in each pixel being imaged. N2 adsorption isotherms were recorded at −193° C. using a Quantachrome Autosorb-1 instrument. Prior to the experiment, the sample was out gassed at 200° C. for 6 h. The surface area was obtained using the BET method using adsorption data over a relative pressure range from 0.05 to 0.30. The total pore volumes were calculated from the amount of N2 vapor adsorbed at a relative pressure of 0.99.

Catalytic Reactions 2.4.1. 2-Butanol Dehydration

Reaction studies for the dehydration of 2-butanol were conducted in a fixed-bed up-flow reactor containing 100 mg of catalyst in a ¼-in.-o.d. stainless steel tube. The reactor was held at a temperature of 513 K and a system pressure of 51 bar. A mass flow controller was used to control the purge gas (Ar) flow to the reactor. Prior to reaction measurements, the reactor was pressurized to 51 bar and heated to 513 K in flowing Ar at a flow rate of 100 $cm^3$ (STP) $min^{-1}$. After flowing Ar for 1 h at the reaction temperature and pressure, a liquid feed consisting of 10 wt % 2-butanol in water was pumped into the reactor at a rate of 0.05 $cm^3$ $min^{-1}$ by an HPLC pump (Eldex). The flow of Ar as the purge gas continued during the reaction at a flow rate of 20 $cm^3$ (STP) $min^{-1}$. Products detected for a typical run were the dehydration products 1-butene, cis-2-butene, and trans-2-butene and analyzed with an online GC (VARIAN CP-3800 GC) using a FID and CP-PoraBOND Q capillary column.

Conversion of γ-Valerolactone (GVL) to Pentanoic Acid

Reaction studies for converting γ-valerolactone (GVL) to pentanoic acid were conducted at 573 K and 35 bar in an up-flow tubular reactor. Before reaction kinetic measurements, the catalyst was reduced at 523 K under flowing $H_2$ (70 $cm^3$ (STP) $min^{-1}$) for 4 h. A feed composed of 50 wt % GVL in water (0.005 mL/min) was pumped to the reactor along with a feed of $H^2$ (70 $cm^3$ (STP) $min^{-1}$). Liquid effluent was collected in a liquid-gas separator at room temperature, and compositions were quantified in a Waters e2695 HPLC system equipped with Waters 2414 refractive index and Waters 2489 UV/Vis detectors. The consumption of GVL and the products were monitored with an Aminex HPX-87P (Bio-Rad) column at a temperature of 358 K using water as the mobile phase at 1 $cm^3$ $min^{-1}$. The effluent gas stream was analyzed with an online GC (VARIAN CP-3800 GC) using a FID and CP-PoraBOND Q capillary column.

Results and Discussion

Catalyst Synthesis and Characterization

Figure 2:
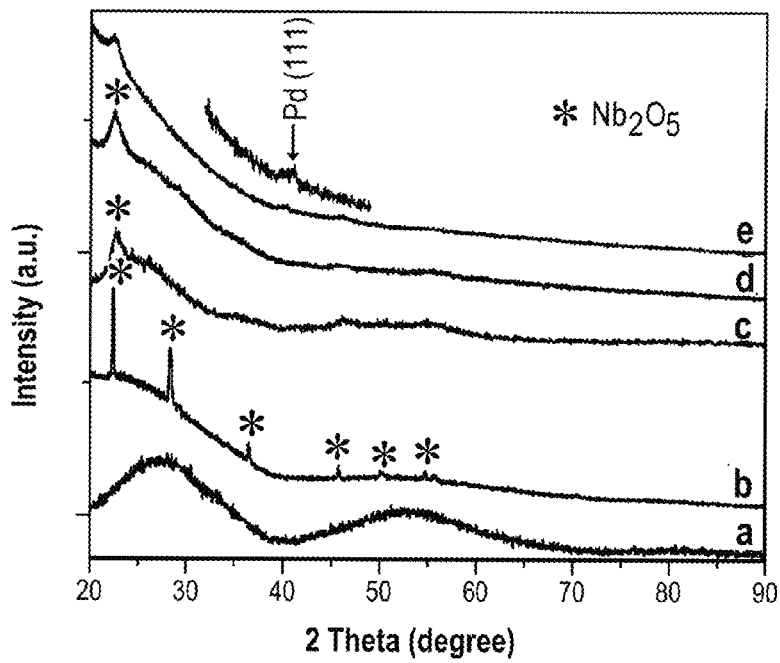
FIG. 2 shows XRD patterns of niobia catalysts before and after aqueous phase reactions.

The XRD patterns of the commercial niobia catalyst (HY-340) and niobia/carbon DPC catalysts are shown in FIG. 2. Line a is commercial $Nb_2O_5$ (HY-340); line b is HY-340 after 2-butanol dehydration; line c is 10Nb/CS-HT before reaction; line d is 20Nb/CS-HT after reaction; line e 1Pd/10Nb/CS-HT bifunctional catalyst before reaction. As can be seen, two broad diffraction peaks corresponding to amorphous niobia can be seen at 20-40° and 40-70° (line a). After 2-butanol dehydration reaction, the HY-340 shows several diffraction peaks at 22°, 28° and 36° (line b) corresponding to crystalline $Nb_2O_5$ (ICDD 028-0317) [4]. For the 10Nb/CS-HT catalyst (lines c and d), several broad and weak diffraction peaks are observed and we see very little change after reaction indicating that the niobia crystallites prepared by the DPC method are small and remain small after reaction. We also show the XRD pattern of 1Pd/10Nb/CS-HT bifunctional catalyst showing a broad diffraction peak for Pd and a very small peak from crystalline niobia (line e).

Figure 3:
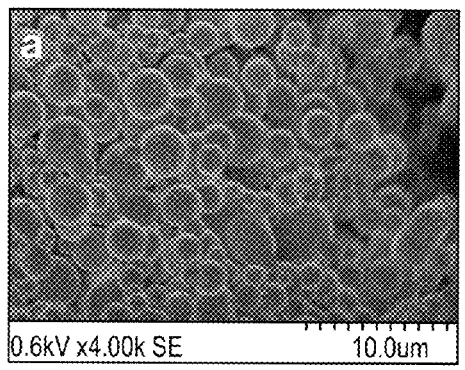
FIG. 3 is an SEM image of 1Nb/CS-HT catalyst prepared by the hydrothermal method described herein.
Figure 4:
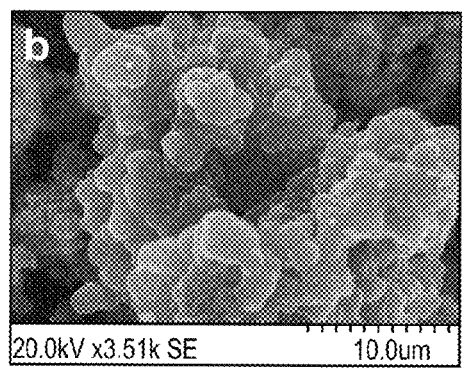
FIG. 4 is an SEM image of 5Nb/CS-HT catalyst prepared by the hydrothermal method described herein.
Figure 5:
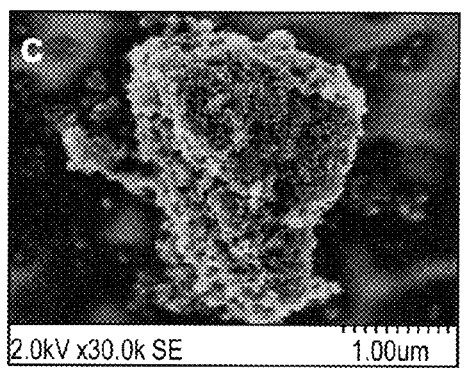
FIG. 5 is an SEM image of 20Nb/CS-HT catalyst prepared by the hydrothermal method described herein.
Figure 6:
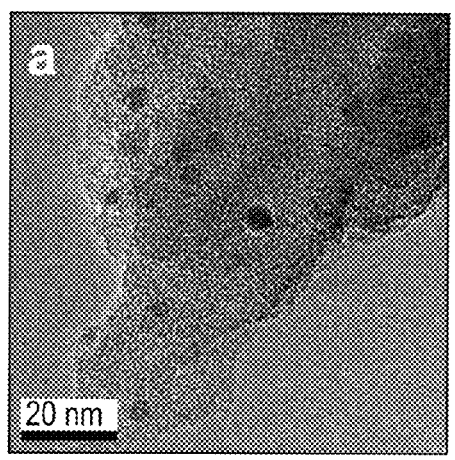
FIG. 6 is a TEM image of 1NB/CS-HT.
Figure 7:
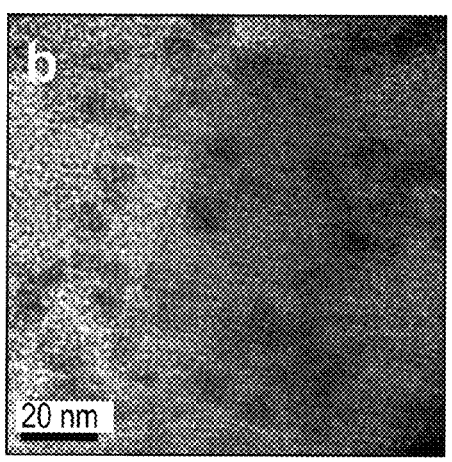
FIG. 7 is a TEM image of 5NB/CS-HT.
Figure 8:
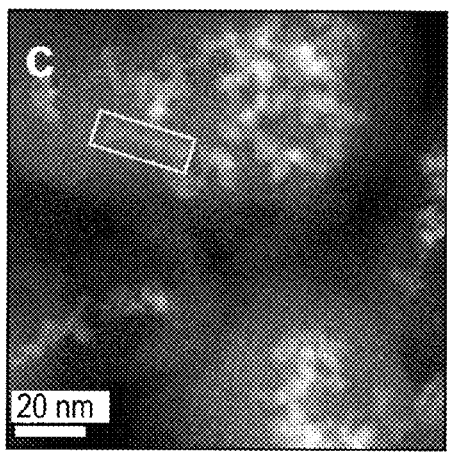
FIG. 8 is a TEM image of 10Nb/CS-HT, the yellow box shows aggregation of niobia particles.

Representative SEM images of the DPC niobia/carbon composite are shown in FIGS. 3-5. As can be seen, the 1Nb/CS-HT catalyst shows a spherical morphology with particle sizes ranging from 1 to 4 μm (FIG. 3). By increasing the niobium loading to 5 wt. %, the obtained composite shows spherical particles with an average size of ca. 2 μm (FIG. 4), and these particles are present as agglomerates. The morphology of the 20Nb/CS-HT was very different showing agglomerates containing particles of ca. 0.1 μm (FIG. 5). The different morphologies of the DPC niobia/carbon composites could be attributed to the effect of niobium on the carbonization process of D-glucose.

Figure 9:
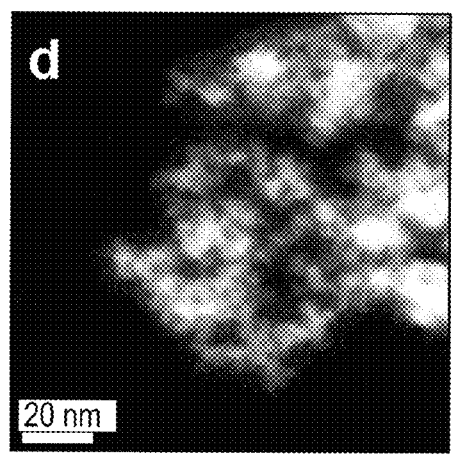
FIG. 9 is a TEM image of 20NB/CS-HT.
Figure 10:
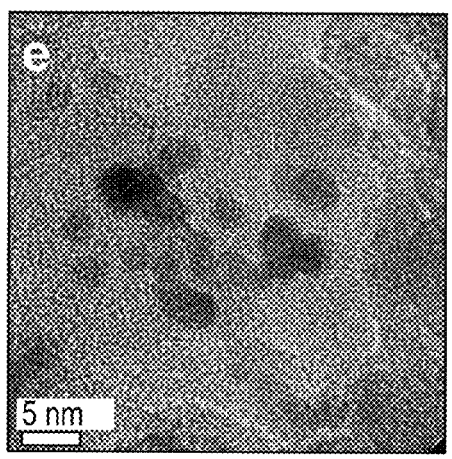
FIG. 10 is an HRTEM image of niobia particles on 5NB/CS-HT.
Figure 11:
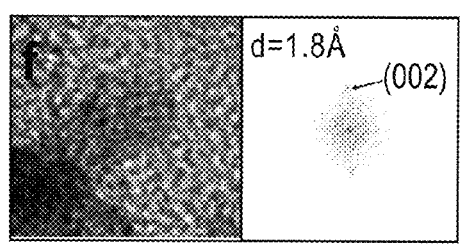
FIG. 11 is a higher magnification view of the niobia particles with Fourier transform showing the lattice fringes and the corresponding interplanar spacing which can be indexed to crystalling $Nb_2O_5$.
Figure 12:
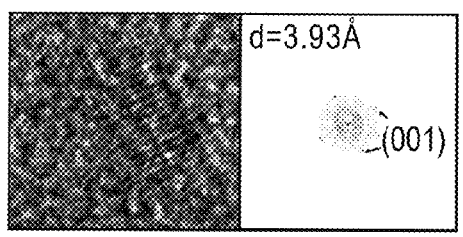
FIG. 12 is another higher magnification view of the niobia particles with Fourier transform showing the lattice fringes and the corresponding interplanar spacing which can be indexed to crystalling $Nb_2O_5$.
Figure 43:
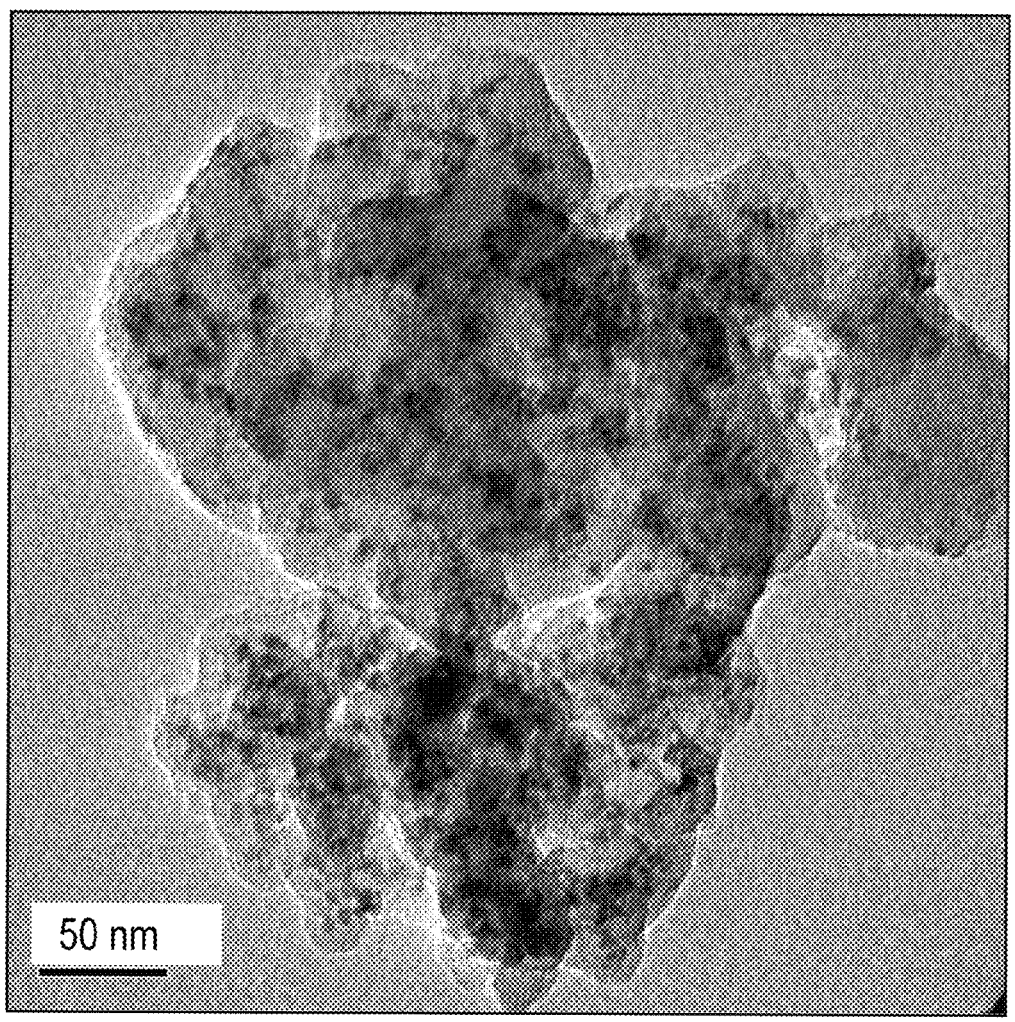
FIG. 43 shows a TEM image of 5Nb/CS-HT niobia/carbon catalysts prepared by DPC.

TEM/STEM was used to observe the nano-scale structure of the materials and representative TEM images of the DPC niobia/carbon catalysts are shown in FIGS. 6-12 and a lower magnification view is shown in FIGS. 43 and 44 to demonstrate the uniformity of the sample. As can be seen, niobia particles with a size of 5-8 nm were present in the 1Nb/CS-HT and 5Nb/CS-HT catalysts (FIGS. 6 and 7) when a low niobium concentration of 6.28 mmol/L was used. Further, it was found that the niobia particles have a tendency to aggregate and formed clusters when the niobia loading was increased to ≥10% (box in FIG. 8), although the niobia particle sizes remained at ca. 8 nm. The extent of aggregation is more pronounced for the 20Nb/CS-HT catalyst (FIG. 9). The high-resolution TEM image of the 5Nb/CS-HT catalyst shows lattice fringes (FIG. 10). Higher magnification views along with Fourier transforms are shown in FIGS. 11 and 12 which confirm the presence of crystalline $Nb_2O_5$. Due to the small crystallite sizes, only the most prominent peaks of $Nb_2O_5$ were seen in the XRD patterns (FIG. 2).

Figure 13:
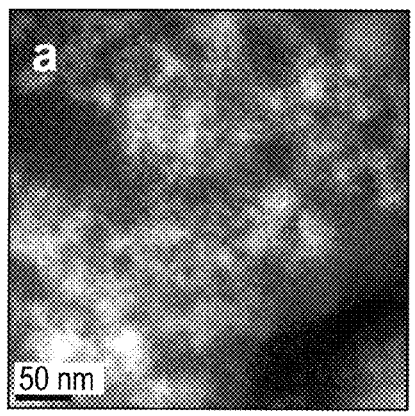
FIG. 13 is a TEM image of 5Nb/CS-HT catalysts prepared using 16.6 mmole/L.
Figure 14:
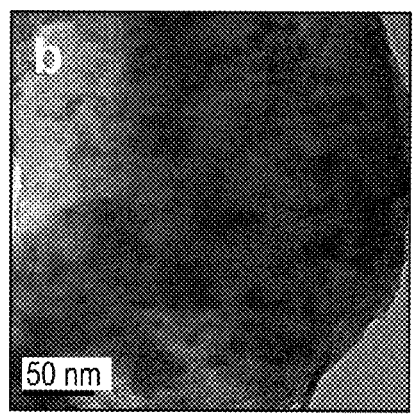
FIG. 14 is a TEM image of 5Nb/CS-HT catalysts prepared using 6.28 mmole/L.
Figure 47:
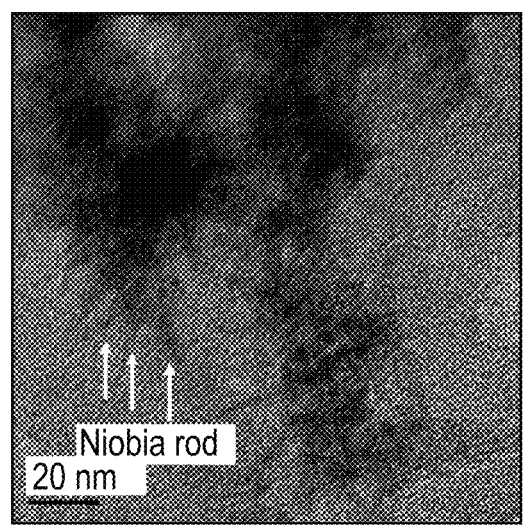
FIG. 47 shows STEM/TEM images of 10 Nb/CS-HT catalysts with high niobium concentration of 16.6 mmol Nb/L (50 mL of water).

The influence of niobium concentration on morphology of 5Nb/CS-HT composite is shown in FIGS. 13 and 14. Niobium concentration was changed by adding different amount of water to the reaction mixtures. For this experiment, we used 4 g of D-glucose dissolved in 50 mL and 250 mL deionized water and mixed with ammonium niobium oxalate (0.6724 g) and urea (0.2826 g). This resulted in niobium concentration of 6.28 and 16.6 mmol/L. It was found that interconnected, rod-like $Nb_2O_5$ structures were formed with the higher concentration (FIG. 4a). A higher magnification view is shown in FIGS. 45-47 to show these rod-like structures more clearly. On the other hand, only discrete niobia particles were formed at the lower concentration (FIG. 4b).

$N_2$ adsorption-desorption results (Table 1) indicated that the surface areas of the niobia/carbon composites are in the range of 101-180 $m^2/g$ and the pore volumes are 0.11-0.66 cm3/g. The pore structure is developed during the pyrolysis step. Before pyrolysis, the BET surface area was only 5 $m^2/g$ with a pore volume of 0.02 $cm^3/g$. By using a low concentration niobium we ensured that discrete niobia crystallites were obtained. Furthermore, it was found that both the BET surface area and pore volume increased with Nb loading. This was ascribed to the effect of niobium on the carbonization process of glucose, which led to smaller carbon particles, as seen in the SEM and confirms the strong interaction between niobia and carbon. The surface areas and pore volumes did not change appreciably after reaction.

TABLE 1

BET surface area, pore volume, and loading of the $Nb_2O_5$/carbon catalysts

| Sample | BET surface area ($m^2/g$) | Total pore volume ($cm^3/g$) | Niobia loading (wt. %) |
|---|---|---|---|
| 5Nb/CS-HT | 101.1 | 0.11 | 4.1 |
| 10Nb/CS-HT | 102.9 | 0.48 | 8.9 |
| 20Nb/CS-HT | 186.7 | 0.66 | 18.6 |

We propose the following mechanism for the formation of niobia/carbon composites. The first step is the deposition-precipitation, which occurs when urea undergoes hydrolysis and provides hydroxyl ions at a temperature above 90° C. [17, 18] to form $NbO(OH)_3$ particles. The addition of urea is important because no particles were found when the synthesis was performed without urea. After the temperature reached 140° C., aromatic compounds and oligosaccharides start to form [19, 20]. The carbonization step arises from cross-linking induced by intermolecular dehydration of oligosaccharides or other macromolecules [20, 21]. Then, the niobium species are embedded in carbon and the niobia/carbon composites are formed after pyrolysis. In step I, niobia particles ca. 8 nm in diameter were formed at low niobium concentrations. With the increase of niobium concentration, the particles formed aggregates, as shown in FIGS. 13 and 14. The primary particles of the niobia/carbon composite decreased in size with increasing niobium loading. This indicates that the niobia affects the carbonization process in the solution because the niobium precursor is an acid catalyst. This picture of the synthesis process is consistent with the SEM images and N2 physisorption results that show the 20Nb/CS-HT having a small particle diameter, a higher BET surface area and higher pore volume than both the 5Nb/CS-HT and 10Nb/CS-HT samples.

Catalyst Performance and Hydrothermal Stability

Figure 15:
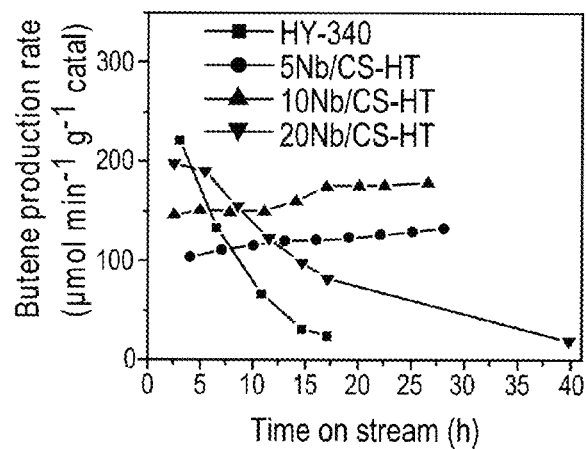
FIG. 15 is a graph depicting the production rate of butene as a function of time on stream.
Figure 16:
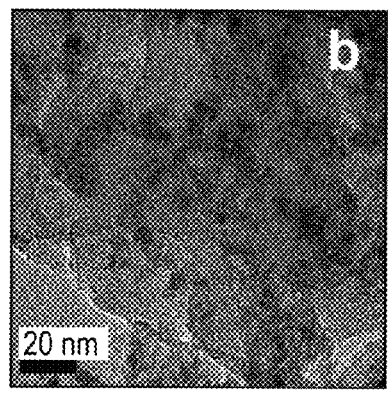
FIG. 16 is a TEM/STEM images of 5Nb/CS-HT catalysts after butanol dehydration at 240° C.
Figure 17:
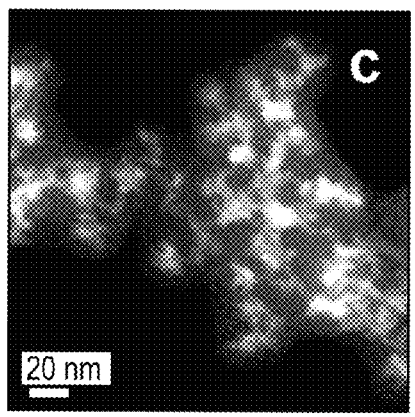
FIG. 17 is a TEM/STEM images of 10Nb/CS-HT catalysts after butanol dehydration at 240° C.
Figure 18:
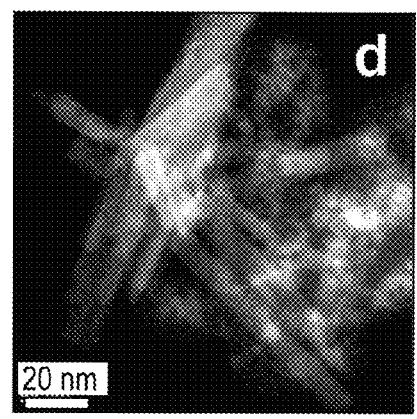
FIG. 18 is a TEM/STEM images of 20Nb/CS-HT catalysts after butanol dehydration at 240° C.
Figure 19:
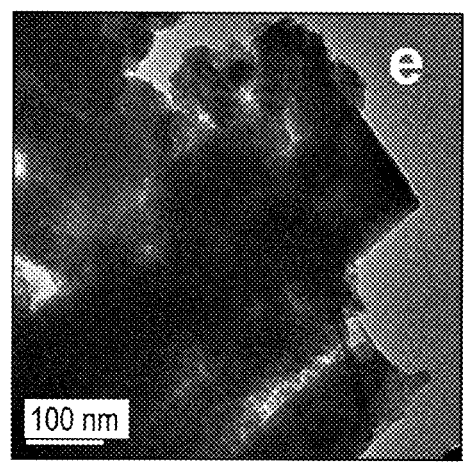
FIG. 19 is a TEM/STEM images of niobia (HY-340) after butanol dehydration at 240° C.

The catalytic activity and hydrothermal stability of the synthesized Nb2O5/carbon acid catalysts was investigated in butanol dehydration at 240° C. and 51 bar pressure (liquid phase). For butanol dehydration in the aqueous phase (FIG. 15), the amorphous niobia catalyst (HY-340) deactivated quickly during the first 20 hours of time on stream. When compared to HY-340, both the 5Nb/CS-HT and 10Nb/CS-HT catalysts show lower initial activity. However, the niobia/carbon composites are very stable and their activity is higher than HY-340 after 8 h of reaction. For the sample containing 20 wt. % niobium loading, we found that the initial activity was comparable to HY-340, however, this sample deactivated quickly, which is similar to the behavior seen on amorphous niobia. The TEM/STEM results for the spent catalyst (i.e. after reaction) showed that the amorphous niobia crystallized (FIG. 19) and formed large particles. It was noted that no change was seen in the spent 5Nb/CS-HT and 10Nb/CS-HT after reaction, compared to the catalyst before reaction (FIGS. 16 and 17). Thus, the superior hydrothermal stability of the two catalysts was ascribed to the strong interaction of niobia with the carbon support. The STEM image of the spent 20Nb/CS-HT revealed that this catalyst contained large crystalline niobia particles after reaction (FIG. 18). Thus, the deactivation of 20Nb/CS-HT with time-on-stream is ascribed to the crystallization of niobia particles indicating that the Nb loading is too high for the carbon to effectively interact with the niobia particles. These findings are similar to some recent reports of nanostructured metal oxides supported on carbon materials [22-24] where it was found that the stability of nanostructured metal oxide depends on the metal oxide loading and the interaction between metal oxide and carbon support [24].

Figure 20:
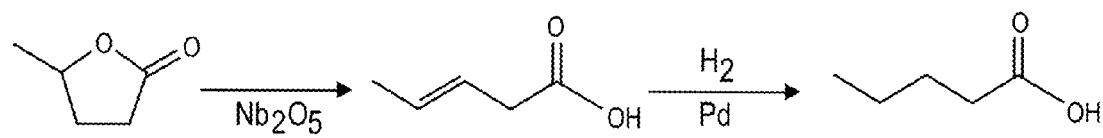
FIG. 20 is the reaction scheme for the conversion of γ-valerolactone to pentanoic acid.
Figure 21:
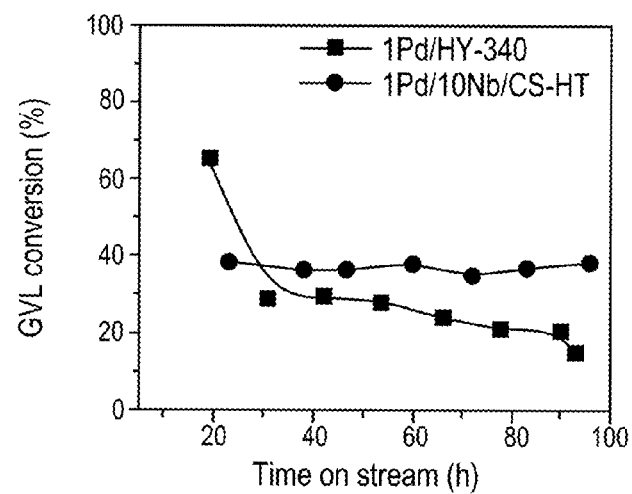
FIG. 21 is a graph showing catalytic activity as a function of time-on-stream in the conversion of GVL to pentanoic acid in aqueous phase.
Figure 22:
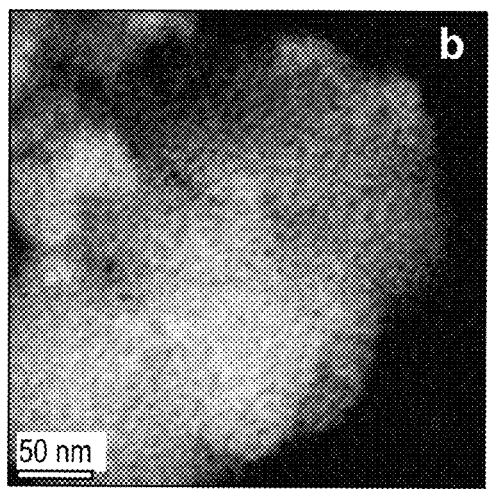
FIG. 22 is a STEM image of 1Pd/HY-340.
Figure 23:
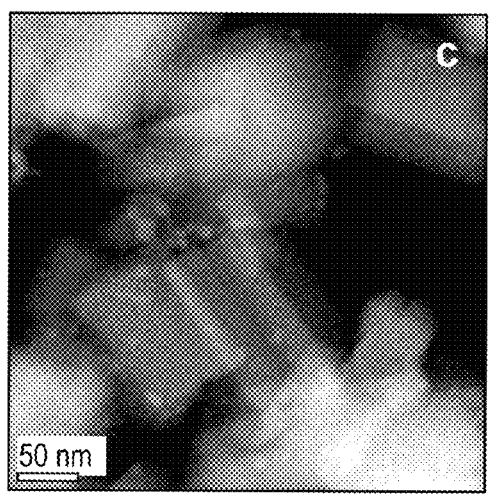
FIG. 23 is a STEM image of spent 1Pd/HY-340 after reaction.
Figure 24:
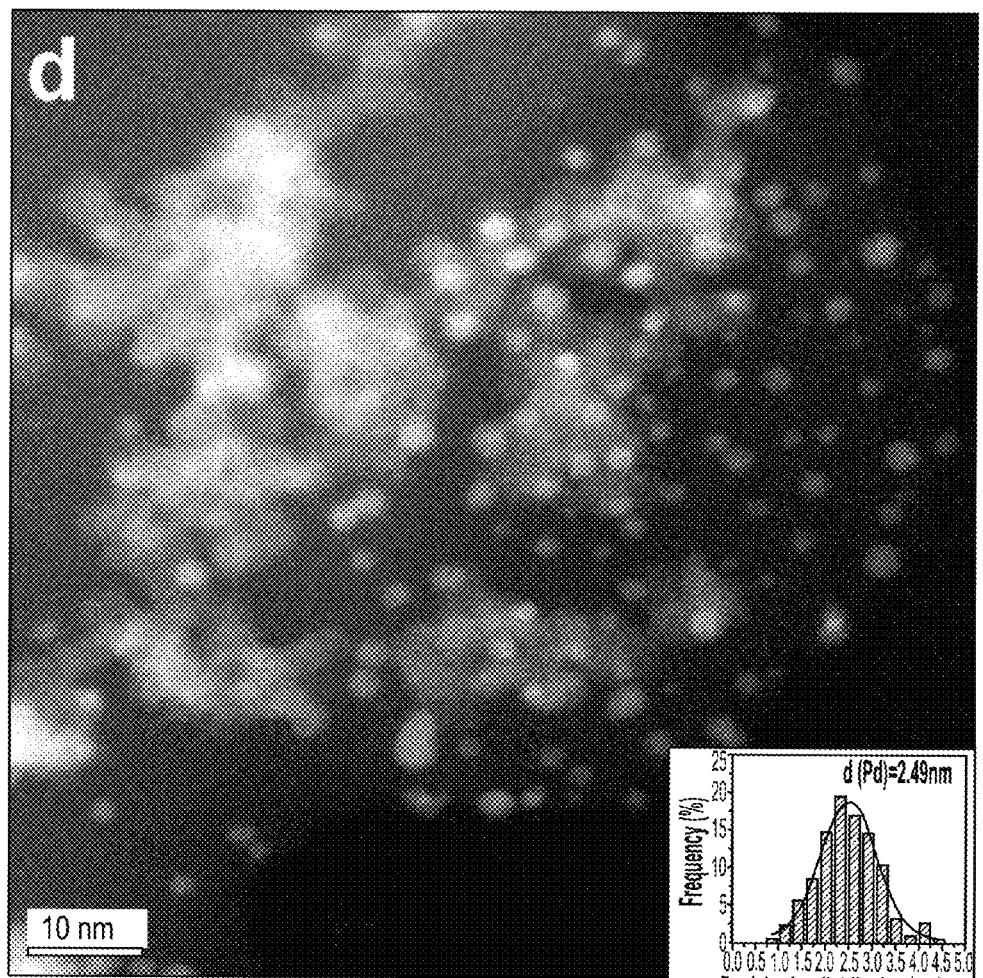
FIG. 24 is a STEM image of 1Pd/10Nb/CS-HT and Pd particle size distribution (inset).
Figure 25:
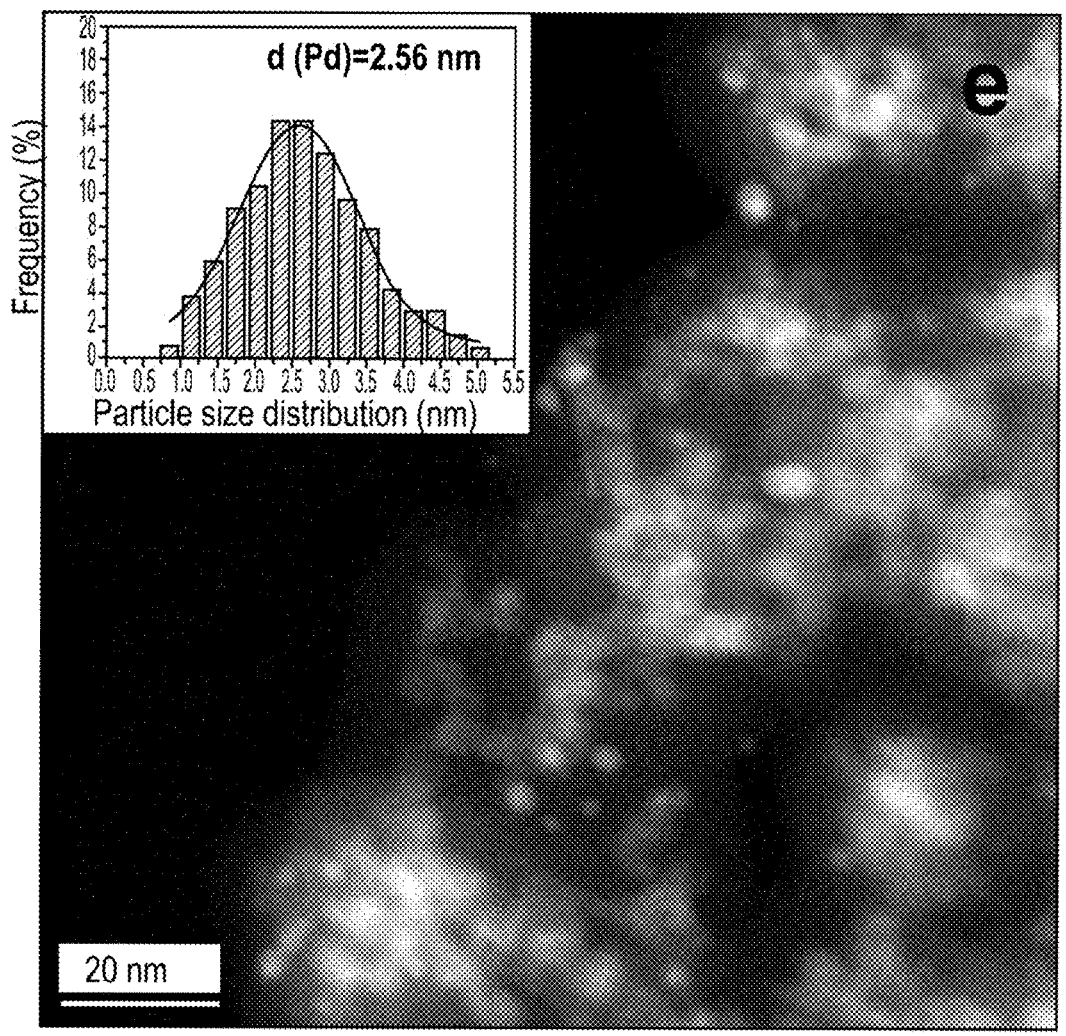
FIG. 25 is a STEM image of spent 1Pd/10Nb/CS-HT after reaction and Pd particle size distribution (inset).

We further prepared 1 wt. % $Pd/Nb_2O_5$ (1Pd/HY-340) and 1 wt. % $Pd/Nb_2O_5$/CS-HT (1Pd/10Nb/CS-HT) bifunctional catalysts using HY-340 and as-prepared 10Nb/CS-HT as support, respectively. The catalytic performance and hydrothermal stability of the prepared bifunctional catalyst was tested in a model biomass reaction in an aqueous phase reactor: the conversion of γ-valerolactone (GVL) to pentanoic acid. γ-valerolactone (GVL) has been identified as a platform chemical with many applications [2, 4, 25, 26], and produced by hydrogenation of levulinic acid, which can be produced potentially at low cost from agricultural waste by processes already demonstrated on a commercial scale. The conversion of GVL to pentanoic acid includes two steps (FIG. 20) [4]: niobia acid catalyst catalyzes the ring-opening of γ-valerolactone to pentenoic acid, followed by metal Pd catalyzed hydrogenation to pentanoic acid. The GVL conversion as a function of time-on-stream on the bifunctional catalyst is shown in FIG. 21. As can be seen, the 1Pd/HY-340 catalyst deactivated quickly in the aqueous phase reaction [4, 16]. The deactivation is similar (activity lost in 30 h) to the deactivation of the HY-340 in the 2-butanol dehydration reaction (where Pd is not present), indicating that the crystallization of niobia plays a significant role in the deactivation process. The 1Pd/10Nb/CS-HT catalyst shows a lower initial GVL conversion, but it is very stable. After 30 h of reaction, the 1Pd/10Nb/CS-HT catalyst exhibits a higher GVL conversion than the 1Pd/HY-340 catalyst. The STEM characterization results of the as prepared catalysts revealed that both 1Pd/HY-340 and 1Pd/10Nb/CS-HT bifunctional catalysts are well-dispersed, and the Pd particle size for 1Pd/HY-340 is less than 1 nm and the average size of Pd particles on 1Pd/10Nb/CS-HT is 2.49 nm (FIGS. 22 and 24). After reaction, the 1Pd/HY-340 becomes crystalline and the Pd particle size increased to >10 nm (FIG. 23). However, the Pd particle size on 1Pd/10Nb/CS-HT did not change after reaction (FIG. 25, inset). We infer that the deactivation of 1Pd/HY-340 bifunctional catalyst in the aqueous phase was likely due to the crystallization of HY-340, which facilitated the sintering of Pd metal. The 1Pd/10Nb/CS-HT catalyst demonstrated superior hydrothermal stability due to the hydrothermally stable niobia/carbon support.

Example II—Comparison of Nb Catalyst Formed from DPC with Nb Catalyst Formed with DP Alone and Nb Supported on Commercial Carbon Black Niobia/Carbon Catalyst Preparation Nb/CB-DP Commercially-available carbon black (CABOT, Vulcan XC 72R) was pretreated in 50% $HNO_3$ at 80° C. and 120° C. for 8 h, respectively. After filtration and washing by water till pH=7, the obtained material was dried at 120° C. for 12 h and denoted as CB-1 and CB-2, respectively. Two niobia/carbon catalysts (nominally 10 wt. % niobium loading) were prepared by homogeneous deposition precipitation (DP) using the pretreated carbon supports. Urea was used as the precipitating agent and the detailed synthesis route was as follows: ammonium niobium oxalate (0.41 g) and urea (0.27 g; 2.5 mol urea per mole of niobium) were dissolved in deionized water (250 mL) and added to 1 g of the functionalized carbon black. Subsequently, the temperature was raised to 90° C. After allowing sufficient time (17 h) for the hydrolysis of the urea, the sample was filtered and washed with deionized water, followed by drying at 100° C. for 10 h and calcining at 250° C. for 4 h in a flow of $N_2$. The samples were denoted as Nb/CB-1-DP and Nb/CB-2-DP (CB stands for carbon black and DP stands for deposition precipitation).

Nb/CS-HT A niobia/carbon catalyst (nominal 10 wt. % niobium loading) was prepared by a method we have called deposition precipitation-carbonization (DPC). The synthesis involved the use of 4 g of D-glucose dissolved in 250 mL dionized water and mixed with ammonium niobium oxalate (0.6724 g) and urea (0.2826 g). The mixture was placed in an autoclave and held at 200° C. for 12 h. The sample was pyrolyzed at 400° C. for 4 h in a flow of N2 and denoted as Nb/CS-HT (CS stands for carbon spheres and HT stands for hydrothermal synthesis).

Catalyst Characterization

N2 adsorption/desorption isotherms were recorded using a Quantachrome Autosorb-1 instrument. Prior to the experiment, the sample was out gassed at 200° C. for 6 h. The surface area was obtained using the BET method using adsorption data over a relative pressure range from 0.05 to 0.30. The total pore volumes were calculated from the amount of N2 vapor adsorbed at a relative pressure of 0.99. Scanning transmission electron microscopy (STEM) was carried out in a JEOL 2010F microscope. The powders were deposited on holey carbon support films after being dispersed in ethanol. An electron probe, diameter of 0.2 nm, was scanned over the specimen, and electrons scattered at high angles were collected to form the images. The image contrast in the HAADF (high angle annular dark field) mode is atomic number dependent and is dependent also on the sample thickness in each pixel being imaged. Thermogravimetric analyses (TGA) was performed with a SDT Q600 TGA using nitrogen or air as the purge gas and a heating rate of 10° C./min. The flow rate of purge gas was always 50 mL/min. Fourier transform infrared spectra (FTIR) were recorded on a Thermo Nicolet 6700 FTIR spectrometer, at a spectral resolution of 4 $cm^{-1}$, using 64 scans per spectrum.

Catalytic Activity and Hydrothermal Stability

Isopropanol Dehydration

Isopropanol dehydration was carried out in a fixed-bed flow reactor as a general probe of the acidic properties of the catalysts. A mass of ca. 20 mg of catalyst was used. The reactor was purged by flowing ultra-high purity (UHP) Ar (ca. 25 mL min-1) for 30 min and then the temperature was increased to 180° C. The reaction was performed at 180° C. and atmospheric pressure with Ar (ca. 25 mL $min^{-1}$) as carrier gas and isopropanol (0.002 mL/min) was pumped to the reactor by a HPLC pump (Eldex). Reactants and products were analyzed with an on-line GC (Varian 3800) equipped with a capillary column (Porapak-T) and a FID detector.

Conversion of Glucose to 5-Hydroxymethylfurfural (HMF)

A biphasic reaction system (water and sec-butyl phenol) was used to study the locations of the catalysts in a biphasic system. The mass ratio of sec-butyl phenol (SBP) solvent to water was 2:1.

Results and Discussion

N2 Physisorption

Table 2 displays the N2 physisorption results for the niobia/carbon composites. As can be seen, all the niobia/carbon catalysts showed a surface area >100 $m^2$/g. Compared to the as-received carbon black, the Nb/CB-2-DP and Nb/CB-1-DP samples show higher pore volumes as a result of the reaction with nitric acid at elevated temperatures. The increase in pore volume is due to the formation of macro pores due to the etching of the carbon, but this also leads to a loss of surface area from Nb/CB-1-DP to Nb/CB-2-DP likely due to a loss of the micropores.

TABLE 2

BET surface area, pore volume of the niobia/carbon catalysts.

| Sample | BET surface area ($m^2$/g) | Total pore volume ($cm^3$/g) | $Nb_2O_5$ loading (wt. %) [a] |
|---|---|---|---|
| Carbon black (CB) | 169 | 0.11 | — |
| Nb/CB-1-DP [b] | 175.2 | 0.25 | 6.9 |
| Nb/CB-2-DP | 149.2 | 0.76 | 6.5 |
| Nb/CS-HT [c] | 102.9 | 0.48 | 8.9 |

[a] $Nb_2O_5$ loading was determined by burning off the carbon in a TGA in air.
[b] CB-1 and CB-2 are carbon black functionalized by nitric acid at 80° C. and 120° C., respectively.
[c] CS-HT: carbon prepared by hydrothermal synthesis17.

Electron Microscopy

Figure 26:
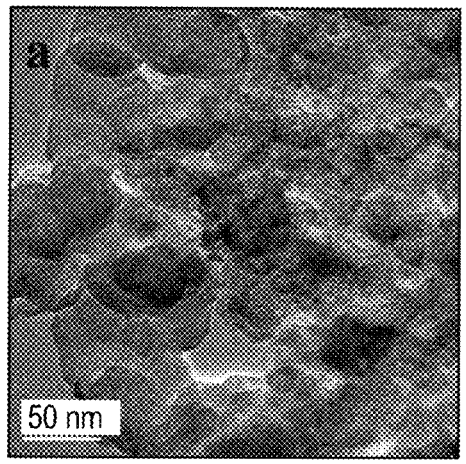
FIG. 26 is a TEM image of as-received carbon black.
Figure 27:
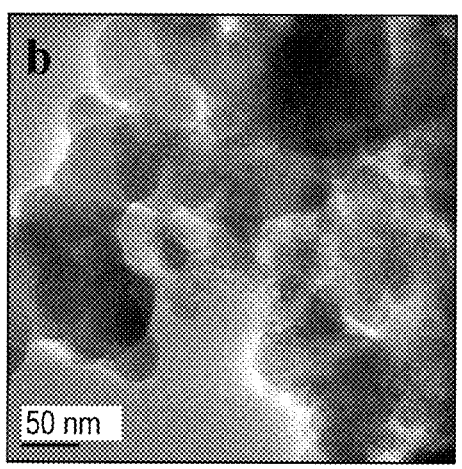
FIG. 27 is a TEM image of carbon black functionalized in nitric acid at 80° C.
Figure 28:
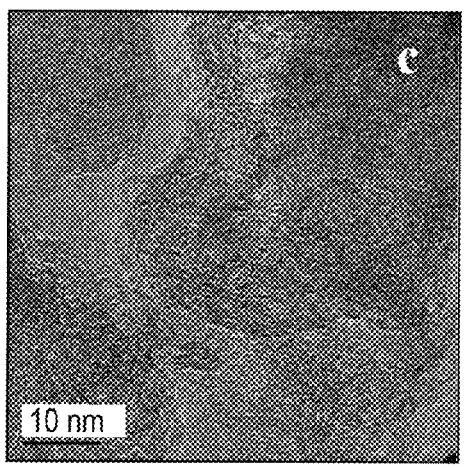
FIG. 28 is an HR-TEM image of carbon black functionalized in nitric acid at 80° C.
Figure 29:
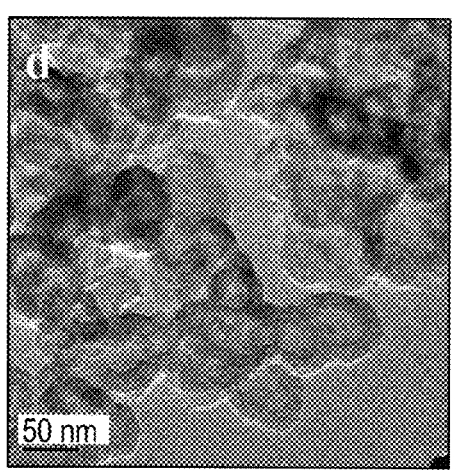
FIG. 29 is an HR-TEM image of carbon black functionalized in nitric acid at 120° C.

FIGS. 26-29 show the TEM images of functionalized carbon black with different extents of nitric acid treatment (CB-1 and CB-2). As can be seen, the as-received carbon black shows spherical particles of graphitic carbon (FIG. 26). After acid treatment at 80° C. we do not see much change in the morphology (FIG. 27). High resolution TEM shows that the carbon spheres are composed of curved graphitic sheets within the spherical particles (FIG. 28). However, after acid treatment at 120° C., the carbon black morphology changed significantly. The TEM images indicate that the primary particles are now hollow, which can explain the increased pore volume of the functionalized carbon (FIG. 29). The observed hollow carbon black structure is a result of the poor degree of graphitization of the interior making it more susceptible to etching when the carbon is treated with nitric acid. The harsher acid treatment creates functional groups transforming the carbon surface from being hydrophobic to becoming hydrophilic so that the carbon can be easily dispersed in polar solvents, such as ethanol.

Figure 30:
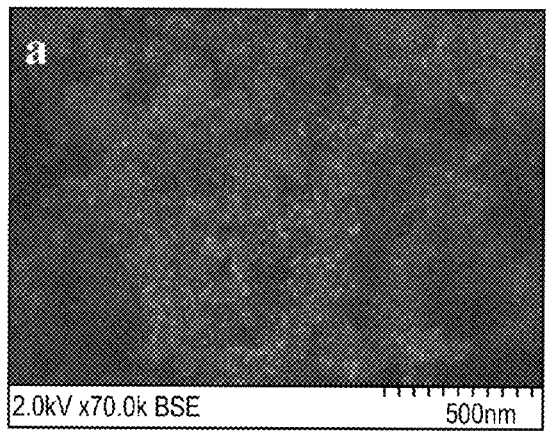
FIG. 30 is an SEM/STEM image of Nb/CB-DP prepared by deposition precipitation.
Figure 31:
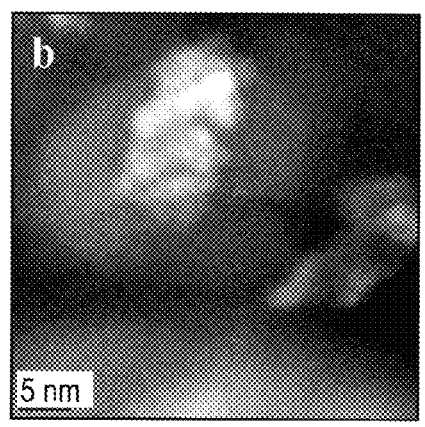
FIG. 31 is an SEM/STEM image of Nb/CB-1-DP prepared by deposition precipitation.
Figure 32:
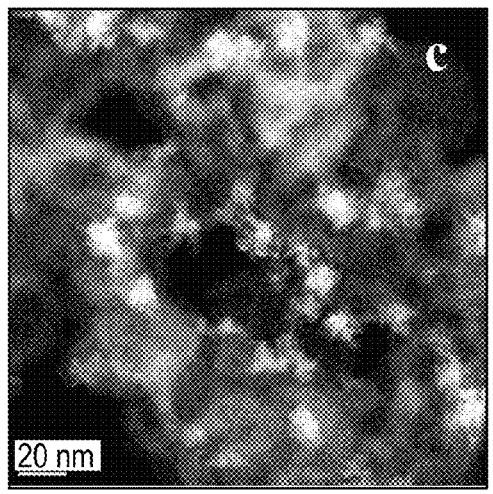
FIG. 32 is an SEM/STEM image of Nb/CB-2-DP prepared by deposition precipitation.

Representative SEM/STEM images of niobia/carbon catalysts prepared by deposition precipitation are shown in FIGS. 30-33. The SEM image of Nb/CB-1-DP shows niobia particles with an average size of 20 nm dispersed on the carbon black surface (FIG. 30). The STEM image shows that the niobia clusters of ca. 20 nm are actually composed of smaller niobia particles with an average size of 3 nm (FIG.

Figure 33:
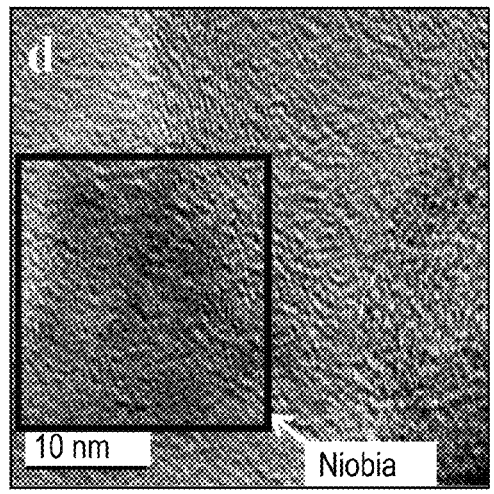
FIG. 33 is an HR-TEM image of Nb/CB-2-DP showing that the niobia particles are amorphous (box).

31). The STEM image of Nb/CB-2-DP shows niobia clusters around 20 nm in diameter, hence there is no significant difference in niobia particle morphology (FIG. 32) compared to Nb/CB-1-DP. The HR-TEM image of Nb/CB-2-DP shows that the niobia particles are amorphous (FIG. 33, insert).

Figure 34:
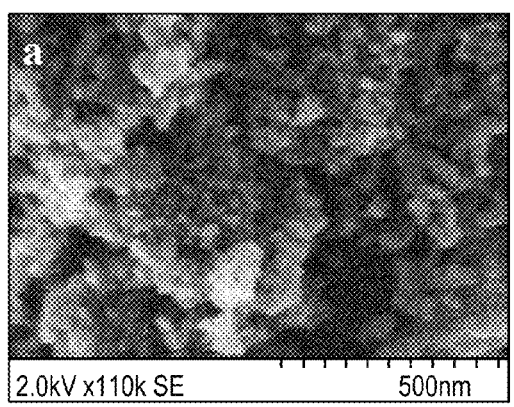
FIG. 34 is electron microscopy SEM image of Nb/CS-HT prepared by the DPC method at 200° C. for 12 h.
Figure 35:
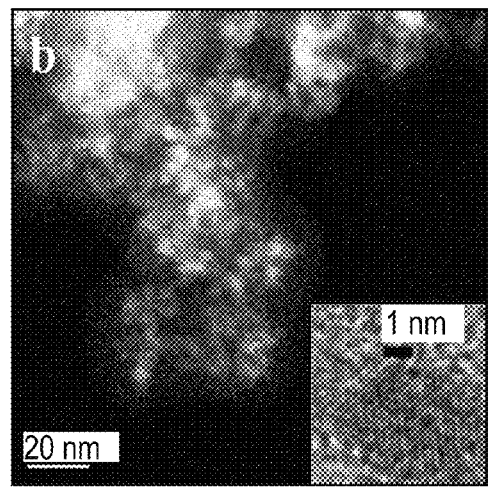
FIG. 35 is a STEM image of the material of FIG. 34 showing clearly the niobia particles and HR-TEM image showing the lattice fringes of niobia (insert).
Figure 40:
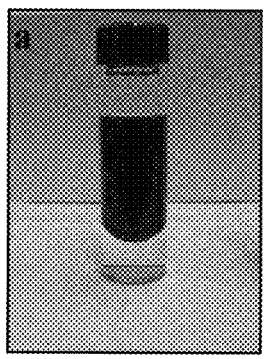
FIG. 40 shows a catalyst dispersed the organic phase in sec-butyl phenol/water (v/v=2).

Representative SEM/STEM images of Nb/CS-HT prepared by the DPC method are shown in FIGS. 34 and 35. As shown in FIG. 34, the Nb/CS-HT composite shows a spherical morphology with a diameter of 20-50 nm. These spheres can be easily crushed yielding a powder that contains niobia particles with a size of ca. 8 nm (FIG. 35). The high-resolution TEM image of Nb/CS-HT shows lattice fringes (FIG. 35, insert) indicating that the niobia particles are crystalline, which is different from the amorphous niobia seen on both Nb/CB-1-DP and Nb/CB-2-DP. The synthesis of this catalyst involved a higher temperature (200° C.) under hydrothermal conditions (22 bar) which causes the niobia to become crystalline.

Fourier Transform Infrared Spectroscopy (FTIR)

FIG. 36 shows the FTIR spectra of the three niobia/carbon catalysts. For Nb/CB-1-DP and Nb/CB-2-DP, two bands at 1693 and 1510 cm$^{-1}$ were observed in the FTIR spectra as well as an intense band at 1800-2600 cm$^{-1}$ (lines a and b). These are ascribed to the formation of functional oxygenate groups on the carbon surface. The bands at 1693 and 1510 cm$^{-1}$ are ascribed to the C=O and C=C bands, respectively 19,22 and the bands at 1800-2600 cm-1 are ascribed to the C—O or C=O species. Further, although the Nb/CB-2-DP shows a similar FTIR spectrum to Nb/CB-1-DP, the former shows more intense peaks than the latter, this indicates that more functional groups are present on the Nb/CB-2-DP catalyst surface. It is interesting to note that the FTIR spectrum of Nb/CS-HT exhibits completely different bands, in comparison with both Nb/CB-1-DP and Nb/CB-2-DP. The FTIR spectrum of Nb/CS-HT shows three bands at 1705, 1590 and 1230 cm$^{-1}$ and no band was found at 1800-2800 cm$^{-1}$. The bands at 1705 and 1590 cm$^{-1}$ are ascribed to the C=O and C=C bands, respectively 23. The band at 1230 cm-1 is ascribed to the C—C band 24. Thus, the FTIR results revealed that a larger amount of functional groups (C=O, C—O and C=C species) were contained on the Nb/CB-1-DP and Nb/CB-2-DP surface and different groups (C=C, C=O and C—C species) were present on the Nb/CS-HT surface. This difference can be related to the method of preparation, acid treatment in the case of the CB samples compared with hydrothermal transformation of a sugar followed by pyrolysis in the case of the CS-HT sample.

TGA Results

The thermal stability of the niobia/carbon catalysts were studied in a flow of N2 and shown in FIGS. 37-39. For Nb/CB-1-DP, <10% weight loss was observed when the sample was heated to 900° C. (FIG. 37). The DTG curve shows that four weight loss regions are observed and centered at 60, 250, 450 and 700° C., respectively. The Nb/CB-2-DP catalyst shows a similar weight loss behavior, while a weight loss of 25% was found when the temperature was increased to 900° C. (FIG. 38). According to our previous study [19], the peak at 60° C. was ascribed to the release of adsorbed water in the sample and the peak between 300 and 600° C. assigned to the removal of some functional groups on the carbon sample. Thus, the Nb/CB-2-DP exhibited significant greater amounts of surface functional groups, as compared to Nb/CB-1-DP. This agrees well with the FTIR result. For the Nb/CS-HT prepared by DPC, two weight loss peaks are found when it was heated in N2 (FIG. 39). The peak at 60° C. was ascribed to the release of adsorbed water in the sample. The peak between 300 and 900° C. assigned to the removal of some functional groups and the decomposition of residual levulinic acid in the catalyst based on NMR [51].

Catalytic Performance and Hydrothermal Stability

Isopropanol Dehydration in Gas-Phase Reactor

The gas-phase reaction of 2-propanol dehydration was used to probe the nature of the surface acid sites in the niobia/carbon solid acid catalysts. Further, a hydrothermal treatment process in an autoclave at 200° C. for 12 h was used to investigate the hydrothermal stability of the catalyst. The results of 2-propanol dehydration at 180° C. for niobia/carbon catalysts before and after hydrothermal treatment are shown in Table 3. As can be seen, before the treatment in liquid water, all niobia/carbon catalysts showed a propylene formation rate range of 1.7-2.4 µmol min$^{-1}$ g$^{-1}$Nb. After treatment in liquid water at 200° C. for 12 h, the activity of all catalysts decreased by about 50%. The higher activity of the Nb/CS-HT catalyst is related to the increased crystallinity of the niobia in this sample, as detected via HR-TEM.

TABLE 3

Reactivity for the dehydration of 2-propanol before and after hydrothermal treatment in liquid water at 200° C. for 12 h

| Catalyst | Propylene formation rate (µmol min-1 g-1Nb) | |
|---|---|---|
| | Before treatment in liquid water | After treatment in liquid water |
| Nb/CS-HT | 2.4 | 1.1 |
| Nb/CB-1-DP | 1.7 | 0.74 |
| Nb/CB-2-DP | 1.9 | 0.81 |

Locations of the Niobia/Carbon Catalysts in a Biphasic System

Figure 41:
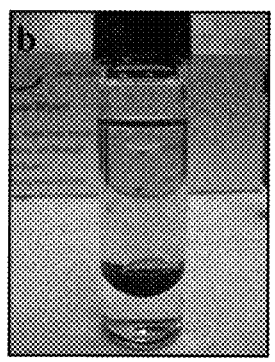
FIG. 41 shows a catalyst dispersed the interface between the organic and aqueous phases in sec-butyl phenol/water (v/v=2).
Figure 42:
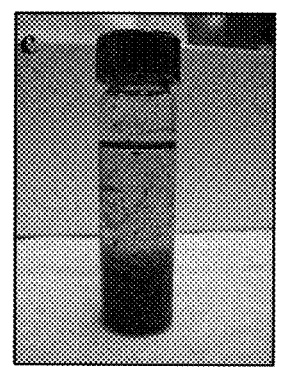
FIG. 42 shows a catalyst dispersed the aqueous phase in sec-butyl phenol/water (v/v=2).

We investigated the locations of the niobia/carbon catalysts in a biphasic system. As can be seen in FIG. 41-43, the Nb/CB-1-DP was present exclusively in the organic phase (FIG. 41), while the Nb/CB-2-DP was entirely present in the aqueous phase (FIG. 43). Because both these catalyst supports are functionalized by nitric acid but at different temperatures and the catalysts are prepared by the same method, the different locations are due to the different degree of hydrophobicity/hydrophilicity on the carbon surface. It is interesting to note that the Nb/CS-HT catalyst was located at the interface between the aqueous and organic phase suggesting it has an intermediate degree of hydrophobicity (FIG. 42).

What is claimed is:

1. A method for preparing a transition element carbon composite material comprising:
    mixing a compound comprising a transition element with a precipitating agent in a sugar-containing solution at a high enough temperature and for a long enough time that the transition element precipitates to yield a hydroxide and/or oxide while the sugar simultaneously undergoes hydrothermal carbonization; and
    heat treating the mixture to form a particulate transition element/carbon material having embedded transition element hydroxide and/or oxide species highly and evenly dispersed through the carbon particles.

2. The method of claim 1 wherein the transition element is a transition metal.

3. The method of claim 2 wherein the transition metal is selected from the group consisting of Ag, Au, Ce, Co, Cr, Cu, Fe, Ir, Mn, Mo, Ni, Pt, Ru, Ta, Ti, V, W, and Zr.

4. The method of claim 2 wherein the transition metal is niobium.

5. The method of claim 1 wherein the base precipitating agent is urea.

6. The method of claim 1 wherein the sugar solution is a glucose solution.

7. The method of claim 1 wherein the high enough temperature is at least 160° C.

8. The method of claim 7 wherein the high enough temperature is less than 240° C.

9. The method of claim 1 wherein the long enough time is at least 2 hours.

10. The method of claim 9 wherein the long enough time is less than 12 hours.

11. The method of claim 1 wherein the step of heat treatment comprises pyrolysis.

12. The method of claim 11 wherein pyrolization takes place in an inert atmosphere.

13. The method of claim 12 wherein pyrolization takes place in a $N_2$ rich atmosphere.

14. The method of claim 1 wherein the embedded transition element hydroxide and/or oxide species are in the form of discrete transition element hydroxide and/or oxide particles.

15. The method of claim 14 wherein the discrete transition element hydroxide and/or oxide particles comprise niobium.

* * * * *